(12) United States Patent
Khanna et al.

(10) Patent No.: US 7,055,024 B2
(45) Date of Patent: May 30, 2006

(54) COMPUTER SYSTEM COMPONENT INITIALIZATION USING A BIOS FORMAL HARDWARE LANGUAGE TO REPRESENT THE INITIALIZATION REQUIREMENTS

(75) Inventors: Rahul Khanna, Beaverton, OR (US); Kirk D. Brannock, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 09/957,789

(22) Filed: Sep. 20, 2001

(65) Prior Publication Data

US 2003/0056090 A1 Mar. 20, 2003

(51) Int. Cl.
*G06F 9/24* (2006.01)
(52) U.S. Cl. .......................................................... 713/1
(58) Field of Classification Search ..................... 713/1
See application file for complete search history.

(56) References Cited

U.S. PATENT DOCUMENTS

| | | | |
|---|---|---|---|
| 5,630,076 A * | 5/1997 | Saulpaugh et al. ......... 710/104 |
| 5,696,968 A * | 12/1997 | Merkin .......................... 713/2 |
| 5,903,894 A | 5/1999 | Reneris |
| 5,991,826 A | 11/1999 | McGee et al. |
| 6,272,626 B1 * | 8/2001 | Cobbett ......................... 713/2 |
| 6,529,966 B1 * | 3/2003 | Willman et al. .............. 710/10 |
| 6,539,473 B1 * | 3/2003 | Hubacher et al. .............. 713/2 |

* cited by examiner

*Primary Examiner*—Lynne H. Browne
*Assistant Examiner*—Eric Chang
(74) *Attorney, Agent, or Firm*—Blakely, Sokoloff, Taylor & Zafman LLP

(57) ABSTRACT

A BIOS system and method to initialize the platform hardware components of a computer system. An object oriented abstraction of each hardware component, the features of the hardware component to be initialized, and the initialization setting for each feature according to a common syntax is input into a BIOS database. An order of initialization is determined based on the initialization dependencies of each component. At initialization, the abstraction for each component is passed to the driver of the component wherein it is interpreted by the driver.

27 Claims, 4 Drawing Sheets

| | | |
|---|---|---|
| BOOLEAN | STANDARD / OEM SPECIFIC | 310a |
| GUID | OEM GUID | 310b |
| STRING | TYPE | 310c |
| STRING | SUB-TYPE | 310d |
| STRING | PROPERTY | 310e |
| STRING | PROPERTY SEPARATOR ",","(" ")" | 310f |
| UNIT64 | DATA LENGTH | 310g |
| UINT8 | DATA | 310h |

310

Description:

STANDARD (0) : this is standard Hardware Type.

OEM SPECIFIC (1) : This is OEM Specific Type (As defined by OEM).

TYPE: CPU, MEMORY, CACHE, IO, BUS, STORAGE, NETWORK
(315a, 315b, 315c, 315d, 315e, 315f, 315g)

SUB-TYPE defines the sub-division of the TYPE.

PROPERTY: Various properties are defined as below: Multiple properties can be defined as a set of strings ENABLE (320a), DISABLE (320b), TERMINATE (320c), ACTIVE (320d), PASSIVE (320e),
SHADOW (320f), UN-SHADOW (320g), FLUSH (320h), CACHE (320i), START (320j),
STOP (320k), POLL (320l), NOTIFY (320m), RESERVED (320n), MAP (320o),
UNMAP (320p), RANGE x y (320q), WARNING (320r), ERROR (320s), INPUT (320t),
OUTPUT (320u), BIT x (320v), ADDRESS x (320w), IO (320x), MEMORY (320y),
VENDOR-ID (320z), DEVICE-ID (320aa), BUS-MASTER (320bb), LATENCY x (320cc), FREQUENCY (320dd),
REGISTER x WIDTH (320ee), SET x (320ff), DATA x (320gg), RESET x (320hh),
MASK x (320ii), REPEAT x (320jj), ADD x (320kk), SUBTRACT x (320ll), DIVIDE x (320mm),
MULTIPLY x (320nn), INCREMENT x (320oo), DECREMENT x (320pp), MAXIMUM x (320qq),
MINIMUM x (320rr)

PROPERTY SEPARATOR: Separates the properties.
DATA LENGTH: Defines the length of the optional data
DATA is the optional data that is required for extensibility.

COMPUTER SYSTEM COMPONENT INITIALIZATION USING A BIOS FORMAL HARDWARE LANGUAGE TO REPRESENT THE INITIALIZATION REQUIREMENTS

TECHNICAL FIELD

This disclosure relates generally to the initialization of computer system components by the computer system Basic Input/Output System (BIOS), and particularly but not exclusively relates to a BIOS system and method to initialize the computer system components by describing each component initialization requirement according to a language, and providing to a driver of each component each described component initialization requirement from statements in the language.

BACKGROUND

The BIOS includes a collection of executable programs and data to initialize the separate components of a computer system. Upon turning on (or alternatively resetting) the computer system, the BIOS executes from the nonvolatile memory. After initializing a nonvolatile memory, in a personal computer, the BIOS commonly loads the operating system or parts of it. Subsequent to loading the operating system, a BIOS routine may be alternatively executed by the BIOS, or may be accessed and executed by the operating system, either from a volatile or from a non-volatile memory.

Each component of a computer system to be initialized has a plug-in routine resident in the non-volatile memory to interface with the component. Conventionally, a BIOS initialization routine initializes a component through its associated plug-in. Conventionally, each BIOS initialization routine is a distinct program having a distinct interface with the driver, which cannot interface with a different driver. When a component is changed or a new component is joined to the computer system, conventionally a separate initializing routine must be built according to the interface characteristics and data requirements of the specific driver with which it is to interface.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. The order of description should not be construed as to imply that these operations are necessarily order-dependent.

FIG. 3 portrays an embodiment of a syntax and common vocabulary of a task list of the present invention.

DETAILED DESCRIPTION

Embodiments of an apparatus and method to initialize the components of a computer system are described herein. In the following description, numerous specific details are provided thoroughly understanding the embodiments of the present invention. One skilled in the relevant art will recognize, however, that the invention can be practiced without one or more of the specific details, or with other steps, methods, systems, components, materials, etc. In other instances, well-known structures, materials, system components, or steps of methods are not shown, or if shown are not described in detail, to avoid obscuring aspects of the invention.

Reference throughout this specification to "one embodiment" or "an embodiment" means that a particular feature, structure, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, steps, or characteristics may be combined in any suitable manner in one or more embodiments.

Various operations will be described as multiple discrete steps performed in turn in a manner that is most helpful in understanding the present invention. However, the order of description should not be construed as to imply that these operations are necessarily order dependent, in particular, the order the steps are presented. Any necessary ordering is alternatively expressly mentioned or will be understood by those skilled in the art.

Figure 1:
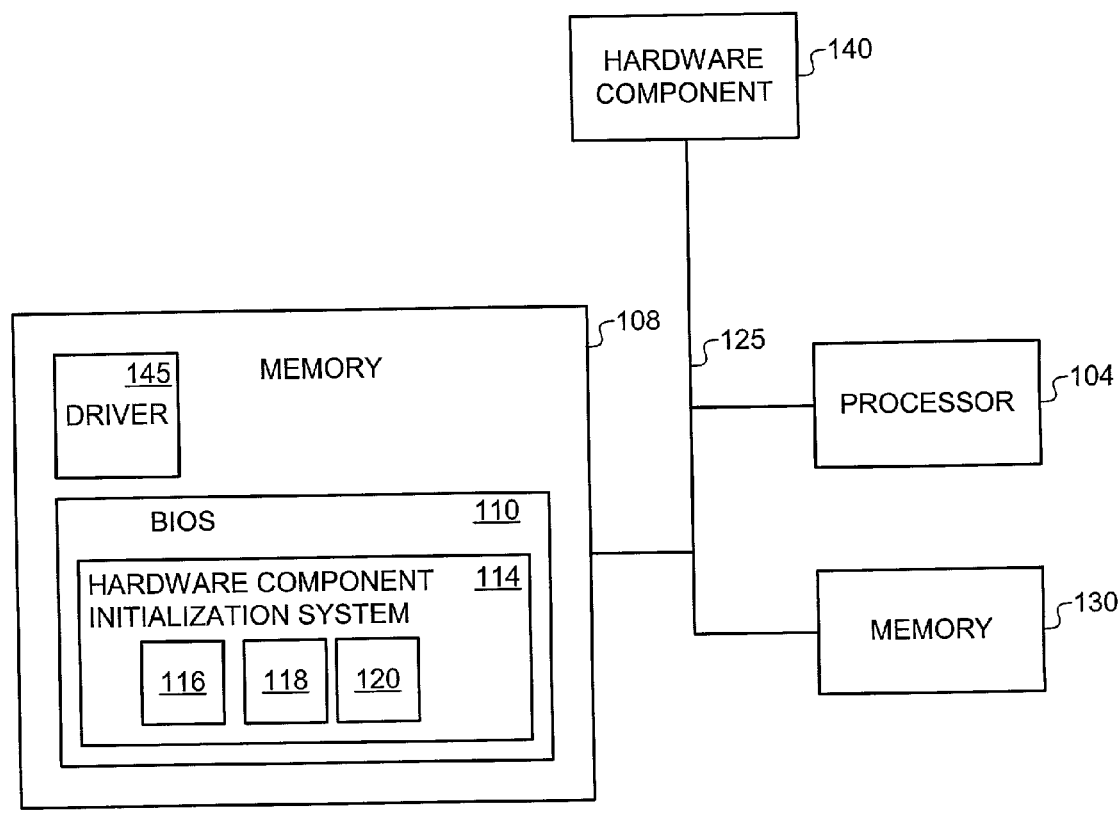
FIG. 1 portrays a logical block diagram of an embodiment of a computing system that includes the present invention apparatus.

Referring to FIG. 1, a computing system 100 includes at least one processor 104 that is coupled by a CPU bus 125 to a solid-state non-volatile random access memory 108 that includes the processor power-on/reset address. The memory 108 stores a BIOS routine 110 that includes the power-on/reset address location. The BIOS routine 110 includes a hardware component initialization system 114 of the present invention. The processor 104 is coupled by the CPU bus 125 to a random access memory 130 that can be written to, and read from. This random-access memory 130 can be a cache, a DRAM, a synchronous direct random access memory (SDRAM), a double data rate (DDR) SDRAM, a quad data rate (QDR) SDRAM, a $D^3DR$ SDRAM, or other memory device. The random access memory 130 stores data that is written to the memory 130 by the processor 104 in operation. In an embodiment, the random-access memory 130 includes a portion of the BIOS that has been loaded into the random-access memory 130 subsequent to the initialization of the random access memory by the BIOS routine 110. In the preferred embodiment of the present invention, the non-volatile memory device 108 is a flash memory device to enable writing to the BIOS for updating the database 116 (to be disclosed presently) in an embodiment disclosed with reference to FIG. 4. The processor 104, CPU bus 125, and memory systems 108 and 130 are together generally mounted on a common motherboard (not shown).

Coupled to the processor 104 are hardware components (chipsets) 140 to be initialized by the BIOS routine 110. The hardware components 140 include separate hardware vendor units such as video cards or SCSI devices. The hardware components 140 include separate computer system physical devices that may or may not have software modules stored on the non-volatile memory 108 such as an interrupt controller, timer, or an Integrated Drive Electronics (IDE) disc controller. The hardware components 140 include bus components such as bridges, and devices attached to the buses. Each component 140 during its initialization is coupled to a driver 145 that may be embodied as a software module stored in the memory 108; or alternatively stored elsewhere in the computing system 100, generally proximate to component 140 as a program to be executed by a computing device; or alternatively embodied as a finite state machine. A driver 145 stored in the memory 108 is also referred to as a plug-in by a person skilled in the pertinent art, and in an embodiment is included within the BIOS routine 110 and functions generally as a modular BIOS 110 extension that may be considered a platform specific component of the BIOS routine 110.

The hardware component initialization system 114 includes a database 116 to store an at least one task list for initializing the computer system 100 components 140. Each task list is to include an at least one initialization task that specifies a hardware component, a feature (characteristic) of the hardware component to be initialized, and an initialization setting for the feature. The tasklist is disclosed further with reference to FIGS. 2 and 3. The hardware component initialization system 114 also includes a dispatcher 118 embodied as a program encoded on the memory 108 and, in operation of the hardware component and initialization system, executed by the processor 104 during the initialization phase of the BIOS routine 108. The hardware component initialization system 114 also includes at least one stored Application Program Interface (API) 120 that are published by the BIOS routine 108. The APIs 120 preferably include an at least one editor API to create the task list to be stored in the database 116, and an at least one assist API to be exposed to the drivers 145 to retrieve a related task in a task list to a specific driver 145. The APIs 120 are disclosed further with reference to FIG. 4.

Figure 2:
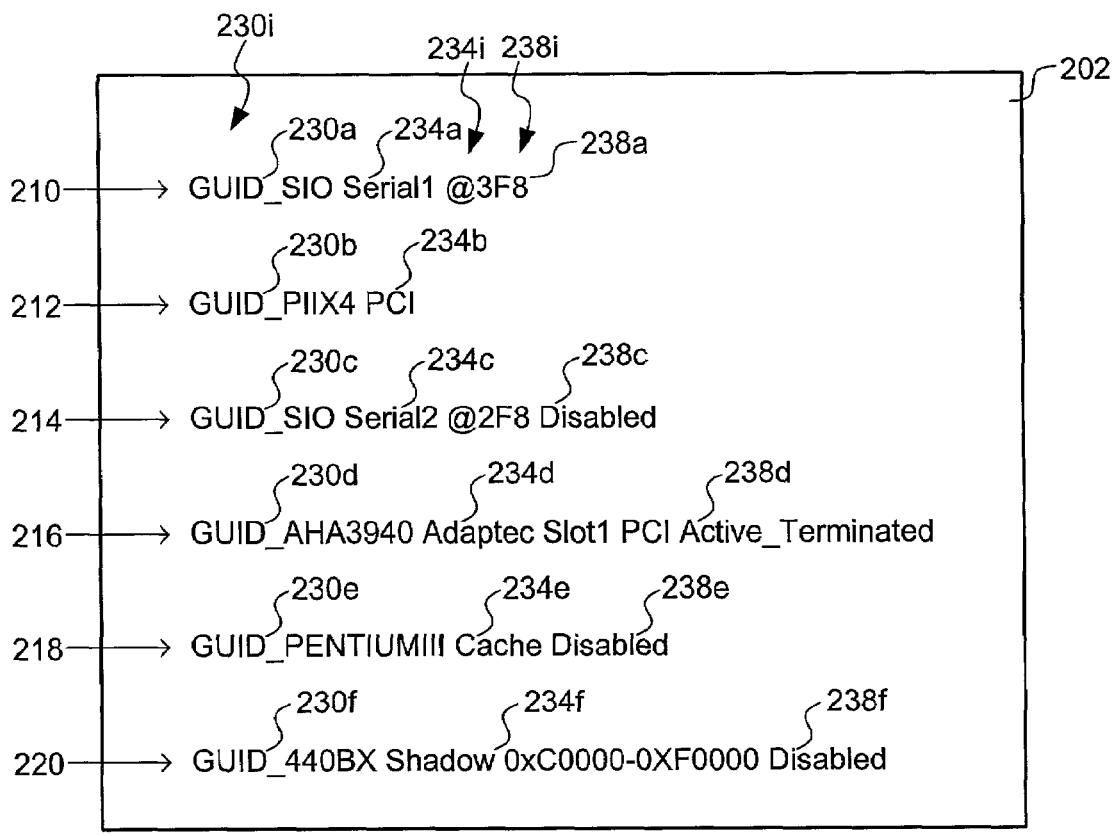
FIG. 2 portrays an embodiment of a task list written in pseudo-code that represents the formal language for hardware representation of the present invention, the task list to initialize the components of an exemplary computer system.

Referring now to FIG. 2, the hardware component initialization system of the BIOS of the present invention includes a task list data set 202 comprising data to initialize each of the separate components of the computer system having software drivers (plug-ins). The task list 202 has separate tasks illustratively portrayed as the six tasks 210, 212, 214, 216, 218, and 220, each to initialize a feature of each component (chipset). Each separate task of the task list 202 is for a particular setting for a particular feature of a particular chipset. In operation, each task of the task list data set 202 is predefined for its associated chipset. Each of the tasks for a specific chipset is passed to the driver of the chipset during the initialization phase of the BIOS execution. The driver interprets the task to derive a setting for that feature of its chipset. Each task for any chipset needs to be understandable to only the plug-in for that chipset. Thus, other than knowing a setting parameter for a feature of a chipset, the BIOS does not have to know the chipset design or the operation of the chipset to initialize the chipset. In an embodiment, the task list 202 is written in a common language that is preferably a higher-level language, to be parsed and interpreted by the BIOS or driver (wherein here, the BIOS will not be considered to include the drivers), preferably the driver. The common language is called a Formal Language for Hardware Representation (FLHR). The present invention includes an illustrative syntax and vocabulary for common expressions of the FLHR, presented below with reference to FIG. 3.

Each individual task includes a hardware component (HC) identification 230$i$ to identify an HC to be initialized by the data set 202. As portrayed herein, the GUID_SIO HC identification 230$a$ is the HC identification for individual task 210, the GUID_PIIX4 HC identification 230$b$ is the HC identification for individual task 212, the GUID_SIO HC identification 230$c$ is the HC identification for individual task 214 (wherein the HC identifications 230$a$ and 230$c$ are the same, and the illustrative task list 202 includes two different features 234$a$ and 234$c$ (to be presented) for the same HC), the GUID_AHA3940 HC identification 230$d$ is the HC identification for individual task 216, the GUID_PentiumIII HC identification 230$e$ is the HC identification for individual task 218, and the GUID_440BX HC identification 230$f$ is the HC identification for individual task 220. Each of the identifications 230$i$ is a unique identifier of an HC.

The HC identifications "GUID_SIO" 230$a$, "GUID_PIIX4" 230$b$, "GUID_SIO" 230$c$, "GUID_AHA3940" 230$d$, "GUID_PentiumIII" 230$e$, and "GUID_440BX" 230$f$ are illustratively presented herein as symbols (or mnemonics) for a specific chipset identification. The preferred identification for each HC identifier 230$i$ is the Global Unique Identifier (GUID) for that HC. A GUID is derived for a chipset according to a standard formula that assures that each HC has a unique identification. A GUID is a 128 bit string, or in binary format a 16-byte number. Thus, in the example given here, GUID_SIO 230$a$ and 230$c$ represents the GUID for a chipset illustratively identified "SIO", GUID_PIIX4 230$b$ represents the GUID for a chipset illustratively identified "PIIX4", GUID_AHA3940 230$d$ the GUID for a chipset illustratively identified "AHA3940", GUID_PentiumIII 230$e$ represents the GUID for a chipset illustratively identified "PentiumIII", and GUID_440BX 230$f$ represents the GUID for a chip set illustratively identified "440BX". "GUID" stands for Global Unique Identifier.

Each of the individual HCs generally includes an HC feature (or characteristic) identification 234$i$ to identify a specific feature for which a setting to be indicated (to be described presently). The feature is illustratively a register, switch, or some other characteristic of the HC driver identified in 230 that is to be initialized to a setting. As portrayed herein, the "Serial1" 234$a$ is the feature identification for the HC identification GUID_SIO identification 230$a$, the "PCI" 234$b$ is the feature identification for the HC identification GUID_PIIX4 identification 230$b$, the "Serial2" 234$c$ is the feature identification for the HC identification GUID_SIO 230$c$, the "Adaptec Slot1" 234$d$ is the feature identification for the HC identification GUID_AHA3940 230$d$, the "Cache" 234$e$ is the feature identification for the HC identification GUID_PentiumIII 230$e$, and the "Shadow" 234$f$ is the feature identification for the HC identification GUID_440BX 230$f$. The features illustratively presented as "Serial1" 234$a$, "PCI" 234$b$, "Serial2" 234$c$, "Adaptec Slot1" 234$d$, "Cache" 234$e$, and "Shadow" 234$f$ are presented herein as symbols (or mnemonics) for a specific feature of a chipset that are specifically understandable to the plug-in of that chipset. In the description of a syntax and a vocabulary for a FLHR presented below with reference to FIG. 3, the meaning of the illustrative features will be more clear.

Each of the individual HCs generally includes an HC setting 238$i$ to specify a value an HC feature 234$i$. As portrayed herein, the "@3F8" 238$a$ is a setting for the feature 234$a$ of the HC 230$a$, the "@2F8 Disabled" 238$c$ is a setting for the feature 234$c$ of the HC 230$c$, the "PCI Active_Terminated" 238$d$ is a setting for the feature 234$d$ of the HC 230$d$, the "Disabled" 238$e$ is a setting for the feature 234$e$ of the HC 230$e$, and the "0xc0000-0xF0000 Disabled" 238$f$ is a setting for the feature 234$f$ of the HC 230$f$. The settings illustratively presented here as "@3F8" 238$a$, "@2F8 Disabled" 238$c$, "PCI Active_Terminated" 238$d$, "Disabled" 238$e$, and "0xc0000-0xF0000 Disabled" are presented herein as symbols (or mnemonics) for a specific setting of a feature that are specifically understandable to the plug-in of that chipset. In the description of a syntax and a vocabulary for a FLHR presented below with reference to FIG. 3, the meaning of the illustrative settings will be more clear.

In the pseudo-code portrayed in FIG. 2, the first task means that the HC "GUID_SIO" has a feature "Serial1" set to "3F8", meaning that the Serial1 port has an address to be programmed to 3F8. Similarly, task 2 means that the "GUID_PIIX4" HC is being identified as a Peripheral Component Interconnect (PCI) root bus device (and it does not have an address because PCI devices are detected on the fly, they are self-configurable). Task 3 means that the "GUID_SIO" HC port Serial2 has an address of 2F8 and is set to Disabled, wherein the list has both an address and a setting. Task 6 means that the "GUID_440BX" HC has memory ranges 0xC0000 to 0xF0000 and is set to disabled, the feature "shadow" meaning a memory range.

Referring now to FIG. 3, while each driver can use its own distinct vocabulary and syntax for its tasks, as long as its tasks are passed to the driver by the FLHR dispatcher (to be discussed with reference to FIG. 4 below), it is preferred that each driver use a standard vocabulary and syntax to enable a standardized preparation and editing of tasks, a standardized way for the BIOS to process each task list, a standardized way for each driver to process its own tasks, and a standardized way to debug a system. A vocabulary and syntax is presented herein. The vocabulary and syntax define a general set of common BIOS hardware abstractions in a scripted language. The FLHR is used to set up the hardware components 140 without a requirement to write a distinct program to interface with each driver 145. However, this invention specifically contemplates that the vocabulary and syntax will grow to accommodate other HC, HC features, and HC settings. A user defines an object-oriented abstraction for the basic functions of the hardware components 145, the abstraction for a function termed a task herein, for the basic functions of a hardware component 140. In the preferred embodiment, each driver specifically parses and interprets its own tasks. Thus, the vocabulary for each plug may include an exception to any uniform vocabulary and syntax.

In the FLHR, the syntax of a task is "STANDARD/OEM SPECIFIC" "OEM GUID" "TYPE" "SUB-TYPE" "PROPERTY" "PROPERTY SEPARATOR" "DATA LENGTH" "DATA" 310. In the task syntax, the task comprises the separate terms: "STANDARD/OEM SPECIFIC" 310a, "OEM GUID)" 310b, "TYPE" 310c, "SUB-TYPE" 310d, "PROPERTY" 310e, "PROPERTY SEPARATOR" 310f, "DATA LENGTH" 310g, and "DATA" 310h.

The term "STANDARD/OEM SPECIFIC" 310a refers to a designation of whether the remainder of the task is in standard FLHR syntax, or is in component specific syntax. "STANDARD" means that the task is in standard FLHR syntax. "OEM SPECIFIC" means that the task is in a component specific syntax. The term "OEM GUID" 310b refers to a specific HC, remembering that in the preferred embodiment, the identifier of an HC is the HC GUID. The term "TYPE" 310c refers to a feature type to be initialized. The term "SUB-TYPE" 310d refers to a feature detail, and is a sub-division of the "TYPE" 310c. The term "PROPERTY" 310e refers to at least one setting (wherein each of a plural number of "PROPERTY" 310e is separated by the "PROPERTY SEPARATOR" 310f). The term "PROPERTY SEPARATOR" 310f refers to a grammatically correct character(s) to separate two other "PROPERTY" 310e terms, and thus separate one "PROPERTY" field from another "PROPERTY" field. The term "DATA LENGTH" 310g refers to the length of optional data. The term "DATA" 310h is the optional data. Furthermore, in a platform, there may be a plural number of the same component or feature to accommodate a plural number of the same component, an "INSTANCE" 310i field may also be used. Illustratively, if a feature is "PENTIUM®", then to distinguish each "PENTIUM®", a "PENTIUM®" may be "PENTIUM INSTANCE1"; while another may be "PENTIUM INSTANCE2".

Illustrative defined "TYPE"s 310c are "CPU" 315a, "MEMORY" 315b, "CACHE" 315c, "IO" 315d, "BUS" 315e, "STORAGE" 315f, or "NETWORK" 315g. An illustrative "SUB-TYPE" 310d for "CPU" 315a is the names of a CPU, e.g. "PENTIUM®". An illustrative "SUB-TYPE" 310d for "MEMORY" 315b is "DDR", "SDR", or "RDRAM". An illustrative "SUBTYPE" 310d for "CACHE" 315c is "LEVEL X", where X is 1,2, . . . An illustrative "SUBTYPE" 310d for "IO" 315d is "ISA IO", or "MMIO", which represent "IO" type. An illustrative "SUB-TYPE" 310d for "BUS" 315e is "PCI", "ISA", "USB", "SERIAL", "PARALLEL", "SCSI", or "APIC". An illustrative "SUBTYPE" 310d for "STORAGE" 315f is a storage device identification such as "INTEL XYRT" to define in this example a specific Intel® Device (e.g. an Intel® SCSI or an Intel® IDE device) having an identification XYRT. An illustrative "SUBTYPE" 310d for "NETWORK" 315g is a protocol such as "TCP". In the preceding embodiment of the syntax of the FLHR, a specific "TYPE" 310c is preceded by the one of the defined "TYPE"s 315a-315g.

Illustrative defined "PROPERTY" 310e is "ENABLE" 320a, "DISABLE" 320b, "TERMINATE" 320c, "ACTIVE" 320d, "PASSIVE" 320e, "SHADOW" 320f, "UNSHADOW" 320g, "FLUSH" 320h, "CACHE" 320i, "START" 320j, "STOP" 320k, "POLL" 3201, "NOTIFY" 320m, "RESERVED" 320n, "MAP" 320o, "UNMAP" 320p, "RANGE x y" 320q, "WARNING" 320r, "ERROR" 320s, "INPUT" 320t, "OUTPUT" 320u, "BIT x" 320v, "ADDRESS x" 320w, "IO" 320x, "MEMORY" 320y, "VENDOR-ID" 320z, "DEVICE-ID" 320aa, "BUS-MASTER" 320bb, "LATENCY x" 320cc, "FREQUENCY" 320dd, "REGISTER x WIDTH" 320ee, "SET x" 320ff, "DATA x" 320gg, "RESET x" 320hh, "MASK x" 320ii, "REPEAT x" 320jj, "ADD x" 320kk, "SUBTRACT x" 32011, "DIVIDE x" 320mm, "MULTIPLY x" 320nn, "INCREMENT x" 320oo, "DECREMENT x" 320pp, "MAXIMUM x" 320qq, and "MINIMUM x" 320rr.

Illustrative defined "PROPERTY SEPARATOR" 310f are ",", "(", and ")".

Figure 4:
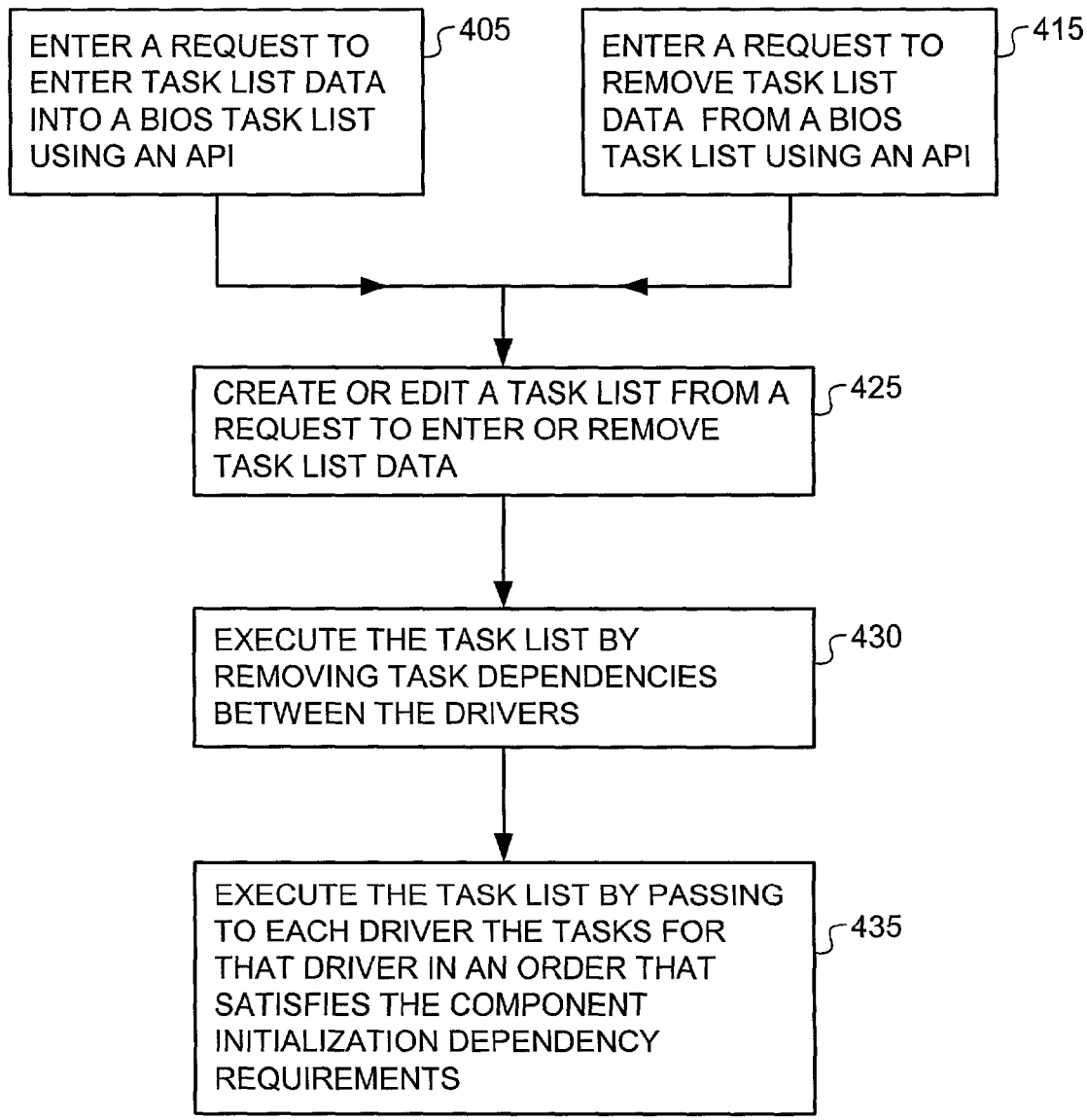
FIG. 4 portrays a flowchart of an embodiment of the present invention to develop and use the task list to initialize the components of a computer system. The order of description should not be construed as to imply that these operations are necessarily order-dependent.

Referring now to FIG. 4, a method of initializing hardware components of a computer system of the present invention is presented. The method preferably includes using APIs published by the BIOS 110 to form a user interface (UI) for editing the task list, and to form an interface with the drivers 145 to pass initialization data to the drivers 145. Exemplary APIs are presented herein. The present embodiment includes updating the task list database 116 in the non-volatile memory 108. Accordingly, the preferred embodiment includes storing the BIOS in a memory that can be written to, such as a flash memory. The present invention is specifically not limited by the embodiment presented herein in an embodiment.

The method includes in block 405 entering task list data into the hardware component initialization system 114 of the BIOS 110 for each of the components to be initialized in a computer system. For each component, the task(s) preferably include a setting for each feature to be initialized. A component provider can prepare the tasks for the component according to a common syntax and semantic rules, the FLHR, that is to allow in an embodiment a parsing routine in the BIOS to separate each task according to a component, and in another embodiment the parsing routine to separate each feature. An embodiment of a common syntax is disclosed with reference to FIG. 3. Preferably, each task is entered into the BIOS according to an "add data" Application Program Interface (API) procedure published by, and under the control of, the hardware component initialization system 114. It is specifically contemplated that the add data API is to include in an embodiment an entry of the component identification, the feature, and the setting data, organized to enter the task list for the computer system, the features and settings for a specific component, or a specific feature and a setting for a component. The tasks are to be entered according to the FLHR.

In block 415, an at least one entry (component identification, feature, and/or setting) to be removed from a task list to edit the task list as necessary is entered into the hardware component initialization system 114. The entry it be removed is entered by an operator according to a "remove data" API.

In block 425, the hardware component initialization system of the present invention software code creates/edits a task list from the data entered or removed in any of the API. In an embodiment, this includes adding to and deleting from the task list.

In block 430, the dispatcher 118 executes the task list by resolving task dependencies between the drivers 145, by preferably each driver 145 identifying to the dispatcher 118 through an API the dependencies of the driver 145, and the dispatcher 118 determining the correct driver entry point based on those dependencies. In order to do this, the method includes the dispatcher 118 executing a parsing of the task list to isolate each component 140 to be initialized. Illustratively, for the task list portrayed in FIG. 2, if driver 1 (HC 230a 1and 230c)is to be executed after driver 4 (HC 230d) to satisfy its dependency, and driver 4 is to be executed after driver 2 (HC 230b) to satisfy its dependency, and driver 4 (HC 230e) is to be executed after driver 2 to satisfy its dependency. A possible order of execution to solve the dependency requirement is driver 1 first, driver 4 second, driver 1 third, driver 4 fourth, and driver 5 (HC 230f) fifth.

In block 435, the dispatcher 118 executes the task list during an execution of the initialization phase of the BIOS 110 by passing to each driver 145 the tasks for that driver in an order that satisfies the initialization dependencies discussed with regard to block 430. The dispatcher 118 passes the tasks to each driver through an API. In order to do this, the method includes the dispatcher 118 executing a parsing of the task list to isolate each task for each component 140. In the embodiment portrayed herein, a binary representation of the tasks for each driver is transmitted to the driver in order of its initialization dependencies for initialization of the corresponding component 140. The driver 145 itself executes a parsing and interpretation software to convert an input task line into a meaningful command that is executed by the driver 145 to program its associated chip-set 145. The individual drivers expose their interfaces and hide their internal implementations, interfacing preferably through an API to the hardware component initialization system 114. Each driver includes a FLHR interpreter to convert the FLHR string into a meaningful command to be executed by the plug-in. In another embodiment of the present invention, a hardware component initialization system 114 module includes a parser to parse a task into its individual feature and setting, and passing that data to the each driver 145 for execution. Each driver 145 initializes the associated component 140 according to the content of the component task(s).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer system of a type having an at least one processor and at least one non-volatile memory that comprises:
   a Basic Input/Output System (BIOS) of the computer system comprising:
      a BIOS database stored in the non-volatile memory that includes a representation according to a common syntax of one or more BIOS initialization tasks for each hardware component of the computer system, wherein each hardware component has a corresponding BIOS plug-in to execute the associated one or more BIOS initialization tasks, wherein each BIOS initialization task includes:
         a hardware component identification;
         a feature identification for a feature of the hardware component; and
         a setting for the feature identified by the feature identification; and
      a BIOS program stored in the non-volatile memory that includes instructions to cause the processor:
         during an initialization phase of the BIOS, to determine an order of the one or more BIOS initialization tasks that accommodates initialization dependency between the one or more BIOS initialization tasks; and
         during the initialization phase of the BIOS, to provide each BIOS plug-in, in the determined order of the one or more BIOS initialization tasks, the one or more BIOS initialization tasks from the BIOS database associated with each BIOS plug-in's corresponding hardware component.

2. The computer system defined in claim 1 wherein the hardware component, the features, and the settings are provided to each of the BIOS plug-ins according to the common syntax.

3. The computer system defined in claim 2 wherein the common syntax defines a scripted language.

4. The computer system defined in claim 1 wherein the BIOS program is to provide to each of the BIOS plug-ins each of the features and settings of the associated hardware component by one of:
   providing to each BIOS plug-in data for each hardware component, and the associated features and settings; and
   for the hardware component associated with the BIOS plug-in the associated features and settings.

5. The computer system defined in claim 1 wherein each hardware component in the database is identified by its GUID.

6. The computer system defined in claim 1 wherein the BIOS program receives each initialization dependency of each BIOS plug-in.

7. The computer system defined in claim 6 wherein each initialization dependency of each BIOS plug-in is received from each BIOS plug-in according to an API.

8. The computer system defined in claim 1 wherein the non-volatile memory comprises a flash memory.

9. The computer system defined in claim 1 wherein in the BIOS program further includes instructions to cause the processor to:
   receive information regarding the hardware components and the associated features and settings, and
   to update the BIOS database stored in the non-volatile memory according to the received information.

10. The computer system defined in claim 9 wherein the information is received according to an at least one API.

11. The computer system defined in claim 9 wherein the information received is according to the common syntax.

12. A machine-readable medium that provides instructions which when executed by a processor, cause said processor to perform operations comprising:
   during an initialization phase of a BIOS of a computer system, during execution of a BIOS program, determining an order of initialization of one or more BIOS initialization tasks associated with hardware components of the computer system that accommodates an initialization dependency between the one or more BIOS initialization tasks, wherein the one or more BIOS initialization tasks are stored in a BIOS database, wherein each of the hardware components is of a type that has an associated BIOS plug-in; and
   during the initialization phase of the BIOS, during execution of the BIOS program, providing to each of the BIOS plug-ins, in the determined order of the one or more BIOS initialization tasks, a feature of the hardware component and an initialization setting for the feature from each of the one or more BIOS initialization tasks associated with each hardware component, the feature and the initialization setting provided according to a common syntax to be interpreted by the BIOS plug-in.

13. The medium defined in claim 12 wherein the hardware component, the features, and the settings are to be received from the BIOS database in a representation according to the common syntax.

14. The medium defined in claim 12 wherein each hardware component is identified by its GUID.

15. The medium defined in claim 12 wherein the medium comprises a flash memory.

16. The medium defined in claim 12 wherein the operations further comprise:
   during execution of BIOS program, receiving information regarding the hardware components and the associated features and settings, and updating the BIOS database according to the received information.

17. The medium defined in claim 16 wherein the information is received according to an at least one API.

18. The medium defined in claim 16 wherein the information received is according to a common syntax.

19. The medium defined in claim 18 wherein the common syntax defines a scripted language.

20. A method comprising:
   during a BIOS initialization phase of a BIOS of a computer system, a processor in executing a BIOS routine of the computer system determining an order of one or more BIOS initialization tasks associated with hardware components of the computer system that accommodates an initialization dependency between the one or more BIOS initialization tasks, wherein the one or more BIOS initialization tasks are stored in a BIOS database, wherein each of the hardware components is of a type that has an associated BIOS plug-in; and
   during the BIOS initialization phase, the processor in executing the BIOS routine, providing to each of the BIOS plus-ins, in the determined order of the one or more BIOS initialization tasks, at least one feature of the hardware component and an initialization setting for the feature from each of the one or more BIOS initialization tasks associated with each hardware component, the feature and the initialization setting provided according to a common syntax to be interpreted by the BIOS plug-in.

21. The method defined in claim 20 wherein the hardware component, the features, and the settings are to be received from the BIOS database in a representation according to the common syntax.

22. The method defined in claim 20 wherein each hardware component is identified by its GUID.

23. The method defined in claim 20 wherein the BIOS database in operation is stored on a flash memory.

24. The method defined in claim 20 further comprising:
   the processor in executing the BIOS routine, receiving information regarding the hardware components and the associated features and settings, and updating the BIOS database according to the received information.

25. The method defined in claim 24 wherein the information is received according to an at least one API.

26. The method defined in claim 24 wherein the information received is according to the common syntax.

27. The method defined in claim 26 wherein the common syntax defines a scripted language.

* * * * *